G. KALBERER.
TOOL HOLDER.
APPLICATION FILED APR. 15, 1919.
1,344,537.
Patented June 22, 1920.
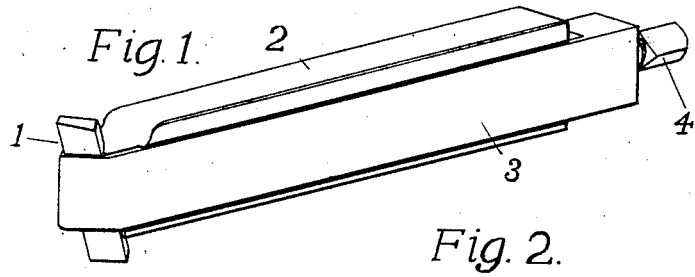
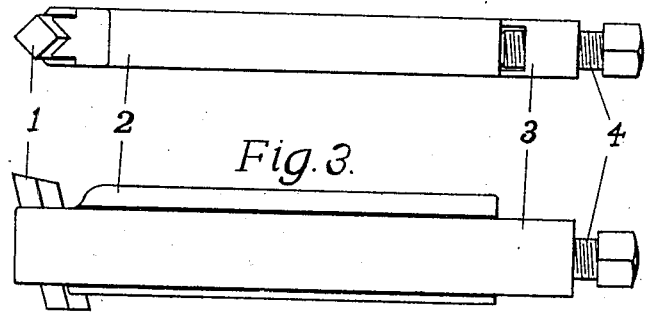
Inventor
Gustav Kalberer

UNITED STATES PATENT OFFICE.

GUSTAV KALBERER, OF KNOXVILLE, PENNSYLVANIA.

TOOL-HOLDER.

1,344,537.  Specification of Letters Patent.  Patented June 22, 1920.

Application filed April 15, 1919. Serial No. 290,329.

*To all whom it may concern:*

Be it known that I, GUSTAV KALBERER, a citizen of the United States, residing at #119 Jucunda Str., Knoxville, in the county of Allegheny and State of Pennsylvania, have invented a new and useful Tool-Holder, of which the following is a specification.

This invention relates to a tool holder, and more particularly to a holder specially adapted for holding suitable lengths or bars of high speed tool steel to be used in connection with lathes and similar machines.

One of the main objects of the invention is to provide a device which will hold the tool in such position that the pressure is exerted against the end of the tool so as to be transmitted substantially longitudinally thereof. A further object is to provide means for gripping the tool with uniform pressure so as to insure even cutting and eliminate all looseness or play of the tool. A still further object is to construct a holder in which the tool is so supported as to eliminate all lateral strain upon the holder. Another object is to provide a holder of very simple and efficient construction composed of a minimum of parts and which may be produced at a small cost. Further objects will appear from the detailed description.

In the drawings:—

Figure 1 is a perspective side view of a holder constructed in accordance with my invention.

Fig. 2 is a top plan view.

Fig. 3 is a side view.

In constructing the holder, I provide a body 2 of substantial elongated rectangular shape, this body having its lateral faces recessed to form longitudinally extending grooves which slidably receive the lateral arms of a holding frame 3, this frame being of greater length than the body and extending completely about the same. A pressure screw 4 is threaded through the outer end of frame 3, the inner end of this screw bearing against the adjacent end of body 2. By means of the screw, the frame and the body may be forced in opposite directions and subjected to great pressure so as to effectively grip a tool 1 positioned between the forward ends of the body and frame, as illustrated.

The frame is provided at its forward end with an inwardly directed substantially V-shaped recess which is inclined downwardly and rearwardly of the frame at an angle of approximately 15°. This recess is positioned in alinement with a similar recess provided in the forward end of the body 2, the apexes of these two recesses being positioned in the vertical plane of the horizontal axis of the body and frame. These recesses receive the sides or faces of tool 1 so as to effectually secure the same. To prevent movement of the tool when thus secured, the walls of the recesses in body 2 are cross cut or knurled to provide a gripping surface which serves to bite into and grip the tool. By means of screw 4, great pressure may be exerted upon the tool so as to effectively secure the same, and as this pressure screw and the recesses for receiving the tool are diposed in alinement and coaxial with the frame and tool, all pressure to which the tool is subjected is transmitted longitudinally of the holder and lateral strains such as would tend to break the frame or holder or cause looseness of the tool are avoided.

I am aware that tool holders employing a slidable member associated with a fixed member for gripping tools have been proposed but, so far as I am aware, tool holders of this type having the holding frame and body associated in the manner illustrated and described, were not known nor used before my invention thereof.

What I claim is:

1. In a tool holder, a body of elongated rectangular shape provided in its lateral faces with grooves extending the full length thereof, and a frame fitting about and inclosing said body and having its lateral arms slidable in said grooves, said frame being of greater length than the body and closed at both ends, and a pressure screw threaded through one end of the frame and bearing against the adjacent end of the body.

2. In a tool holder, an elongated body of rectangular cross section and uniform width provided in its lateral faces with grooves extending the full length thereof, a frame of greater length than the body and having its lateral arms slidable in said grooves, said frame being of uniform width for substantially its full length and closed at both ends, and a pressure screw threaded through one end of said frame and bearing against the adjacent end of the body.

3. In a tool holder, a body, a frame of greater length than the body and extending about the sides and ends thereof, said frame being slidably and permanently connected to the body, and a pressure screw threaded through one end of the frame and bearing against the adjacent end of the body.

GUSTAV KALBERER.